United States Patent [19]

Lunn et al.

[11] 4,452,331

[45] Jun. 5, 1984

[54] VEHICLE AXLE

[75] Inventors: Royston C. Lunn, Ann Arbor; J. Edwin MacAfee, Grosse Ile; Robert C. Grabowski, Dearborn Heights; Dennis N. Renneker, Troy; John M. Winkler, Temperance, all of Mich.

[73] Assignee: American Motors Corporation, Southfield, Mich.

[21] Appl. No.: 206,332

[22] Filed: Nov. 13, 1980

[51] Int. Cl.³ .............................................. B60K 17/34
[52] U.S. Cl. ..................................................... 180/247
[58] Field of Search ............... 180/247, 249, 250, 233, 180/24.1

[56] References Cited

U.S. PATENT DOCUMENTS 2,770,150 11/1956 Culverwell et al. ............. 180/247 X
3,058,558 10/1962 Hawk .............................. 180/247 X
3,283,298 11/1966 Kaiser ............................. 180/247 X
4,271,722 6/1981 Campbell ........................ 180/247 X
4,341,281 7/1982 Nagy ................................... 180/247

Primary Examiner—John A. Pekar
Attorney, Agent, or Firm—Brooks & Kushman

[57] ABSTRACT

A vehicle axle for use in a vehicle having both two-wheel drive and four-wheel drive operating modes. The vehicle axle includes a pair of flanged axle shafts interconnected through an axle differential. One of the shafts has inner and outer sections which can be selectively coupled and uncoupled through a shiftable clutch collar to obtain four-wheel drive mode of operation or two-wheel drive mode of operation, respectively. The shifting of the clutch collar is effected by a vacuum motor which is responsive to a control signal to cause the collar to shift between positions for mode selection. The vacuum motor has a flexural diaphragm whose displacements are transmitted through linkage to the clutch collar to effect its shifting. In the two-wheel drive operating mode, the outer section of the axle shaft is not coupled to the inner section and rotates freely under the influence of its associated wheel. The inner section of the axle shaft, the axle differential, and the other axle shaft all rotate under the influence of the opposite wheel. In the four-wheel drive operating mode, the shaft sections are coupled for cooperative rotation of the wheels through the axle differential.

8 Claims, 16 Drawing Figures

VEHICLE AXLE

CROSS-REFERENCE TO RELATED APPLICATIONS

The present application is related to and incorporates by reference the entire disclosure of co-pending application and entitled "Vehicle Drive System Having First and Second Operating Modes and Method of Operating Same," Ser. No. 206,337, now U.S. Pat. No. 4,381,828 filed on even date with the present application and "Transfer Case," Ser. No. 206,338, now U.S. Pat. No. 4,373,604, also filed on even date with the present application.

TECHNICAL FIELD

This invention relates to vehicle axles and more particularly to a vehicle axle suited for use with a four-wheel drive automobile having both a four-wheel drive operating mode and a two-wheel drive operating mode.

BACKGROUND ART

In four-wheel drive vehicles with both two-wheel drive and four-wheel drive modes, some means must be provided for disengaging one axle (typically the front axle) from the drive train when operating in two-wheel drive mode. Operation in the two-wheel drive mode is generally more efficient for safe, on-road driving conditions, and in a "part-time" system with no inter-axle differential, two wheel drive mode is the normal mode for travel on dry, hard surface roads.

One method of allowing the wheels of the non-driven axle to rotate free of the drive train in two-wheel drive mode is to provide each of the wheels with manual locking hubs. For example, the U.S. Pat. No. 3,414,096 of Reed discloses locking hubs which allow the front wheels to rotate independently of their associated axle. In order to lock or unlock the hubs, the driver of the vehicle must get out of the vehicle and manually turn a control on each hub to its locked or unlocked position, respectively.

Another method of adapting to two-wheel drive mode is for the driver to use a manual shift lever in order to allow at least one of the wheels to rotate free of the axle. For example, the U.S. Pat. No. 1,440,341 of Crispen discloses an axle having one side which can be disconnected by a system in which a shift fork controls movement of a clutch collar or sleeve to selectively connect or disconnect spindle sections of the axle. After disconnection, one of the wheels is free to rotate while the other is driven from a source of power. Likewise, the U.S. Pat. No. 2,913,929 of Anderson discloses a front axle double disconnect mechanism actuatable by a movable lever located in the passenger compartment of the vehicle. The movable lever is connected through linkage to complementary clutch collars which are shiftable between four-wheel drive and two-wheel drive positions on the left and right axle shafts. In the U.S. Pat. No. 2,770,150 of Culverwell a front axle design for a four-wheel drive vehicle includes a mechanism for simultaneously connecting or disconnecting the right and left axle shafts to a center differential. The connection takes place while shifting complementary clutch collars located within the front differential housing. The U.S. Pat. Nos. 1,284,759 to Paxton and U.S. Pat. No. 3,058,558 to Hawk disclose disconnect mechanisms adjacent the wheels of a vehicle for changing vehicle operation between four-wheel drive and two-wheel drive. Each disconnect mechanism includes a shiftable clutch collar.

Other disconnect mechanisms of the type to which this invention relates are disclosed by the U.S. Pat. Nos. 2,384,781, of Rockwell et al. 3,552,516, to Beard et al., 3,522,861 to Middlesworth et al and 2,084,406 to Morgan.

DISCLOSURE OF THE INVENTION

An object of the present invention is to provide an improved axle for use in a vehicle having a four-wheel drive operating mode and a two-wheel drive operating mode wherein a transition to the two-wheel drive operating mode can be obtained without substantial manual operations.

Another object of the invention is to provide an axle particularly adapted for use in a four-wheel drive vehicle of the type having a transfer case with a two-wheel drive operating mode and a four-wheel drive operating mode and wherein the operating states of the axle and the transfer case are coordinated so that the axle is not in its two-wheel drive operating state at any time the transfer case is in its four-wheel drive operating state.

In carrying out the above objects and other objects of this invention, an axle for use in a drive system for a four-wheel drive vehicle is provided. The drive system includes a transfer case responsive to a control signal to selectively transmit torque from a source of power to the axle. The axle includes a differential adapted to be coupled to the transfer case assembly through a propeller or drive shaft. The axle also includes a first axle shaft and a second axle shaft, each connected at one end to the differential and at the other end to a respective wheel. One of the axle half-shafts comprises inner and outer sections which can be selectively engaged by a shiftable clutch collar to control the transfer of torque to the wheel connected to the outer section.

The axle also includes a control mechanism, preferably in the form of a vacuum motor, which actuates the clutch collar means between the two-wheel drive position in which the inner and outer axle half-shaft sections are not coupled, and a four-wheel drive position in which the inner and outer sections are coupled for co-rotation. In addition, the axle includes means for providing a binary signal indicating the position of the clutch collar.

The objects, features and advantages of the present invention are readily apparent from the following detailed description of the best mode taken in connection with the accompanying drawings.

BEST MODE FOR CARRYING OUT THE INVENTION

Figure 1:
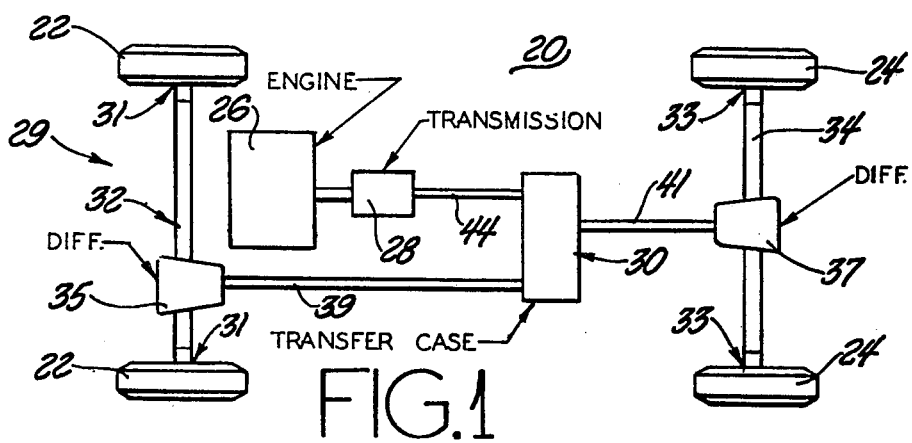
FIG. 1 is a schematic view of the present drive system.

Referring to FIG. 1, a vehicle of a type suited for use with the present invention is indicated generally by 20. The vehicle 20 has a pair of front wheels 22 and a pair of rear wheels 24 drivable from an engine 26 through a transmission 28 which may be of the manual or automatic type.

The front wheels 22 are driven through the cooperative action of a front drive mechanism 29 and a transfer case 30. The front and rear wheels 22 and 24 are part of front and rear wheel assemblies 31 and 33, respectively, which, in turn, are connected at opposite ends of front and rear drive axles 32 and 34, respectively. The drive axles 32 and 34 include front and rear differentials 35 and 37, respectively, which are coupled in driven relation to front and rear drive shafts 39 and 41. The drive shafts 39 and 41 are connected at their opposite ends in driven relationship to the transfer case 30. An input shaft 44 couples the transmission 28 and the transfer case 30 to supply power thereto.

TRANSFER CASE

Figure 2:
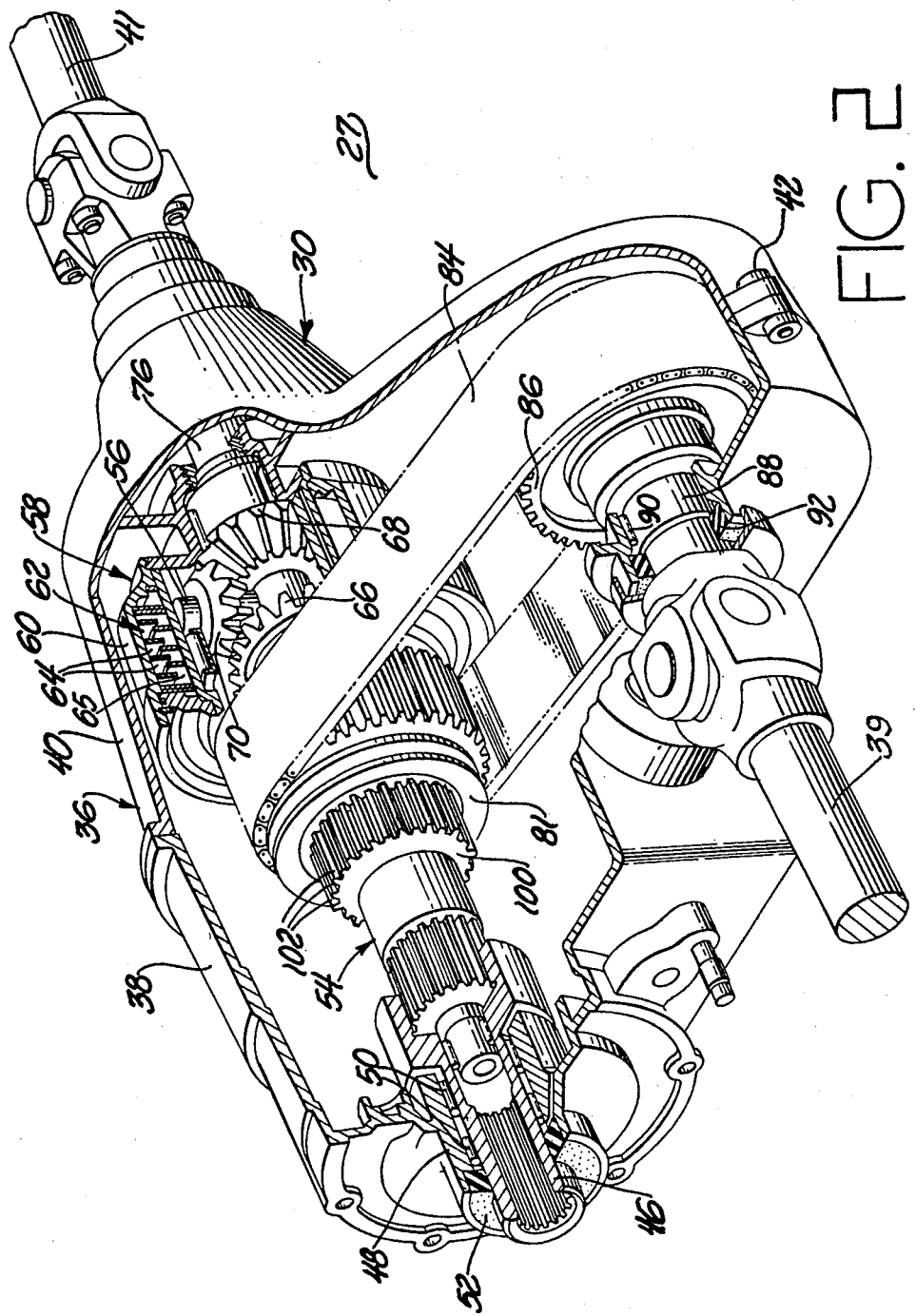
FIG. 2 is a perspective view, partially broken away, of a transfer case for use in the subject invention.

Referring to FIG. 2, there is shown a transfer case assembly 27 comprising the transfer case 30. The transfer case 30 includes a housing generally indicated at 36 having a front half 38 and back half 40 secured together by fasteners 42 (only one of which is shown). The front half 38 of the housing 36 receives the transmission output shaft 44 within an internally splined input shaft 46. The input shaft 46 is supported for rotation within a collar portion 48 of the front half 38 of the housing 36 by bearings 50. The input shaft 46 is sealed within the collar portion 48 by an oil seal 52.

Power from the shaft 44 is transmitted by the input shaft 46 to a main shaft 54 which, in turn, is coupled to a pinion shaft 56 of a limited slip inter-axle differential generally indicated at 58. The differential 58 includes an outer housing drum 60 which houses a multi-disc clutch 62 comprising a plurality of plates 64. The closely stacked plates 64 are enclosed within the outer housing drum 60 together with silicon fluid which provides silicon coupling between the front and rear wheels 22 and 24, respectively, as generally described in the U.S. Pat. No. 4,022,084 to Pagdin et al.

The differential 58 further includes a pair of side gears 66 and 68 and a pair of differential pinions 70 (only one of which is shown) which are positioned at a 90-degree angle to each of the side gears 66 and 68 and which mesh with both side gears 66 and 68. The differential pinion 70 are free to rotate on the pinion shaft 56.

Figure 3:
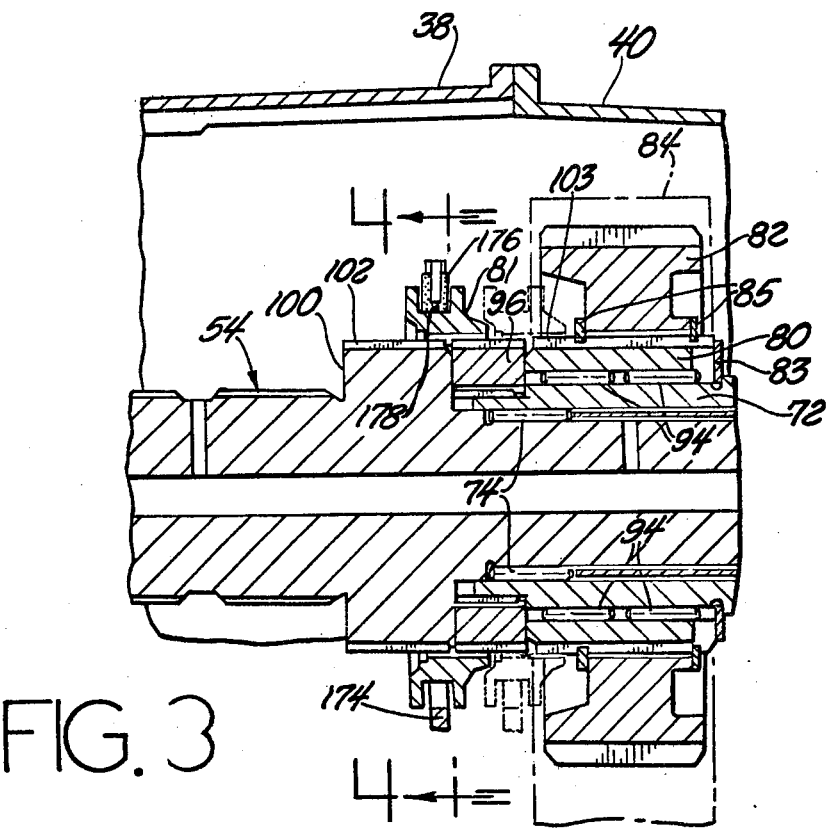
FIG. 3 is a sectional view, partially broken away, of the transfer case and showing part of the mechanism for changing the mode of operation of the present drive system.

One of the plates 64 and the side gear 66 are coupled to a hub or tubular member 72, shown in FIG. 3. The tubular member 72 is mounted coaxially about the main shaft 54 and is supported for rotation thereon by bearings 74.

Another one of the plates 64 and the side gear 68 are coupled to a rear output shaft 76 to provide output power to the rear drive shaft 41 in a conventional fashion. As described hereinabove with reference to FIG. 1, the rear drive shaft 41 drives the rear wheels 24 through the rear differential 37.

In general, the inter-axle differential 58 comprises a viscous drive differential which allows the front and rear sets of wheels 22 and 24 to rotate independently under normal driving conditions but which transfers torque to the set of wheels which has higher traction when the other set of wheels slips. The transfer case 30 comprises a modified version of a transfer case commercially available from the New Process Gear Corporation, a subsidiary of Chrysler Corporation, Highland Park, Mich., designated NPG Model 119.

As best shown in FIG. 3, the tubular member 72 is selectively coupled to a toothed carrier 80 by a shiftable clutch collar 81. The carrier 80 is secured against axial displacement on the tubular member 72 by a thrust washer 83. The carrier 80 carries a drive sprocket 82 thereon to rotate therewith and drive a chain 84 which, in turn, drives the front drive shaft 39. The drive sprocket 82 is fixedly mounted to the carrier 80 by retaining rings 85.

The chain 84 is coupled to the front drive shaft 39, as seen in FIG. 1, by means of a lower, driven sprocket 86 which, in turn, is coupled to a front output shaft 88 which is mounted for rotation and sealed within the front half 38 of the housing 36 by bearings 90 and an oil seal 92, respectively. The output shaft 88 is coupled to the front drive shaft 39 in a conventional fashion.

Figure 4:
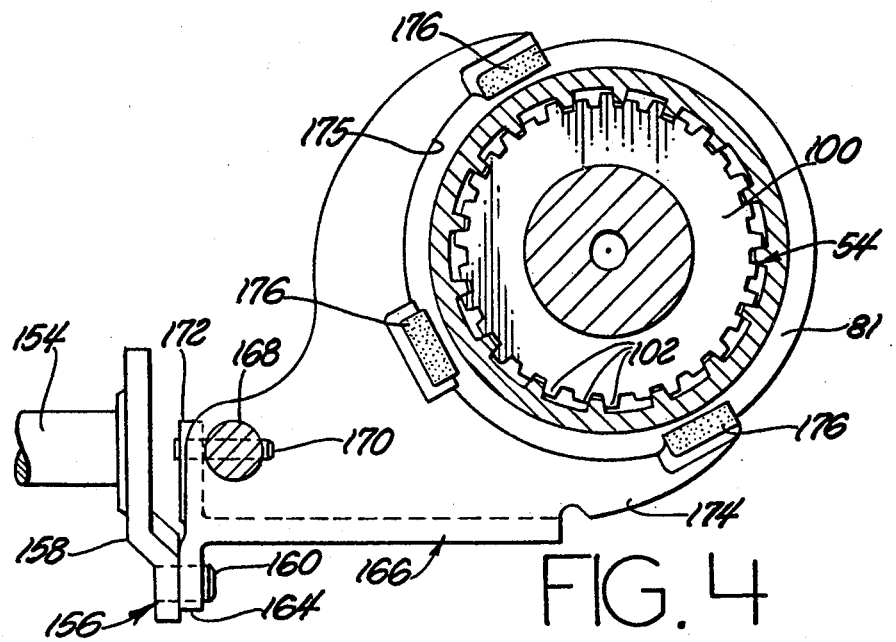
FIG. 4 is a sectional view, partially broken away, taken along lines 4—4 of FIG. 3.

The carrier 80 is mounted for rotation on the tubular member 72 by bearings 94. A clutch 96, preferably having 32 teeth, is splined at the free end of the tubular member 72 opposite the side gear 66 and is engaged in sliding relation with the clutch collar 81 which preferably has a theoretical configuration of 32 teeth of which alternating ones are removed resulting in 16 actual teeth as shown in FIG. 4. The clutch collar 81 is always engaged with the clutch 96. In the position shown in FIG. 3, the clutch collar 81 also engages a toothed segment 100 of the main shaft 54. Teeth 102 of the toothed segment 100 are formed with a conical taper ramp with every other tooth cut back to decrease the likelihood of tooth butting between the tooth portion 100 and the clutch collar 81. The teeth 103 of the carrier 80 also have this same tooth configuration to decrease the likelihood of tooth butting with the clutch collar 81.

In FIG. 3 the transfer case 30 is in its two-wheel drive operating state wherein the main shaft 54 directly drives the tubular extension 72 which, in turn, drives the output shaft 76 through the gear connection in the differential 58.

When the clutch collar 81 is shifted to the right as shown in phantom in FIG. 3, so that it engages not only the clutch 96 but also the carrier 80, the transfer case 30 is placed in its four-wheel drive operating state and transfers power to the front drive shaft 39.

The sliding movement of the clutch collar 81 is controlled by a control mechanism comprising a number of cooperating parts within the transfer case assembly 27. These parts are shown in FIGS. 3, 4, 5 and 6 and include a fluid actuated servomotor 104 defined by a vacuum motor 106 and connecting linkage 108 illustrated in FIG. 6.

A collar 110 is mounted on the inboard side of the vacuum motor 106 and extends therein. The collar 110 has an axial passage 112 extending therethrough in which a shaft 114 of the linkage 108 is supported for sliding movement therein. The vacuum motor 106 and the collar 110 are mounted to the front half 38 of the housing 36 by a mounting bracket 116 at the collar 110.

The vacuum motor 106 includes a flexural diaphragm 118 which divides the volume 120 within the housing 121 into an outer chamber 122 and an inner chamber 124. The outer chamber 122 of the volume 120 is in communication with an outboard vacuum port 126 and, correspondingly, the inner chamber 124 is in communication with an inboard vacuum port 128. The vacuum ports 126 and 128 are alternately placed in communication with a source of vacuum pressure to flex the diaphragm 118 as will be described in greater detail hereinbelow.

The shaft 114 includes an end portion 130 which is connected by a fastener 132 to the diaphragm 118. The diaphragm 118 is disposed between a pair of flattening discs 134 which are secured to the diaphragm 118 to hold the diaphragm 118 in place therebetween. As the diaphragm 118 flexes toward the inner chamber 124, the shaft 114 moves to the right. As the shaft 114 approaches its rightmost position, a section 136 of the shaft aligns with and uncovers a vacuum output port 138 to place the inner chamber 124 of the cavity 120 in communication with the output port. The end portion 130 of the shaft 114 is of a reduced diameter than a medial portion 136 of the shaft that slides within the axial passage 112 in a sealed relation obtained by a sealing ring 140. A nib 142 is fixedly disposed within the output port 138 extends radially from the collar 110 to receive a vacuum hose or line, the purpose of which will be explained in greater detail hereinbelow.

An opposite end portion 144 of the shaft 114 is pivotally connected to a link 146 by a pin 148. The link 146 is pivotally connected to a crank 150 by a pin 152. The crank 150 is fixedly mounted on a rotatable shaft 154. The shaft 154 extends through and is supported by the front half 38 of the transfer case housing 36.

Figure 5:
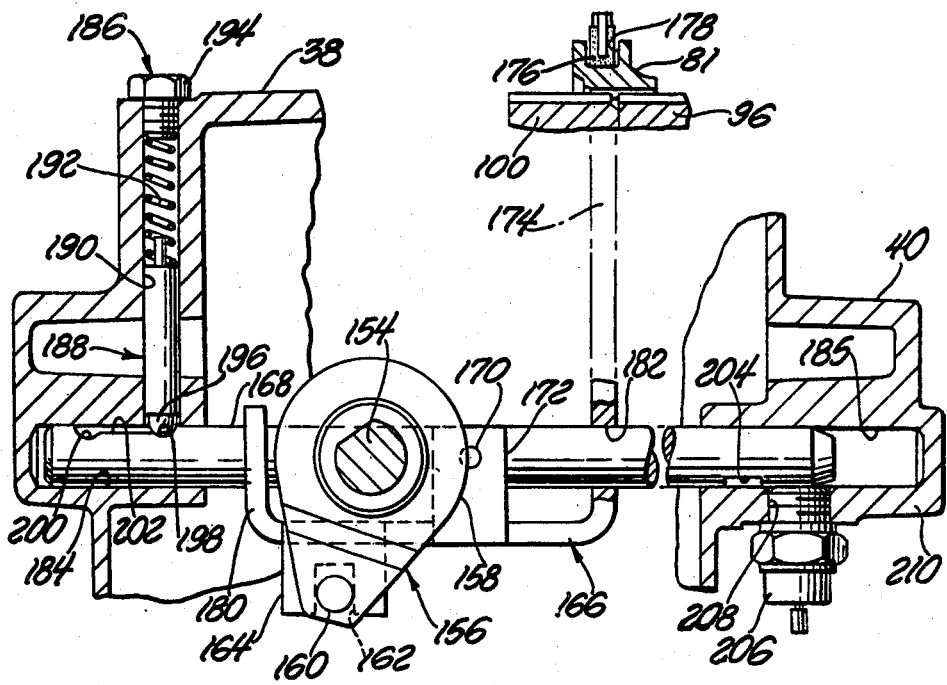
FIG. 5 is a sectional view, partially broken away, of part of the mechanism within the transfer case of FIG. 2 for changing the mode of operation of the drive system.

The crank 150 is preferably rotatable through an angle of approximately 30 degrees in response to the linear motion of the shaft 114. As shown in FIG. 5, rotary motion of the shaft 154 is transmitted to another crank assembly, generally indicated at 156, disposed within the housing 36. The crank assembly 156 includes a crank arm 158 which is mounted on the shaft 154 to rotate therewith and a pin 160 which is positioned in a slot 162 formed in a downwardly extending tang 164 of a shift fork assembly 166. By movement of the pin 160 within the slot 162, the shift fork assembly 166 translates the rotary motion of the crank arm 158 to a linear motion which allows the shift fork assembly 166 to slide within the housing 36. The shift fork assembly 166 is slidably mounted within the housing 36 on a rail or shaft 168 by a pin 170 which extends through the rail 168 and another upwardly extending integral tang 172. A fork 174 of the shift fork assembly 166 has a plurality of pads 176 mounted on its inner curved surface 175 at spaced positions thereon. The pads 176 straddle the clutch collar 81 within an annular groove 178 formed in the collar. The shaft 168 extends through a pair of spaced holes 182 (only one of which is shown) formed through the fork 174 and upwardly extending arm 180 of the shift fork assembly 166. The shaft 168 supports the shift fork assembly 166 at the arm 180 and the fork 174. In turn, the shaft 168 is supported for sliding movement within bores 184 and 185 formed in the front and back halves 38 and 40, respectively, of the housing 36.

A retention assembly is provided to maintain the shaft 168 and, consequently, the shift fork assembly 166 and the clutch collar 81 in positions corresponding to the two-wheel drive operating state or the four-wheel drive operating state of the transfer case 30. The retention assembly may take the form of assembly 186 which includes a plunger 188 disposed within a bore 190 formed in the front half 38 of the housing 36. The retention assembly may also take the form of retainer clips strategically mounted on the shaft 168. The plunger 188 is biased downwardly by a spring 192 disposed between the plunger and a locking bolt 194. The plunger 188 includes a spring-loaded ball 196 at its lower end which locks the axial position of the shaft 168 within the bores 184 and 185 by engaging with either one of detents 198 and 200 formed at opposite ends of a groove 202 in the outer surface of the shaft 168.

Although not forming a part of the preferred embodiment, at the opposite end of the shaft 168, a notch 204 may be formed in its outer surface. When the shaft 168 slides to its rightmost position a reciprocable plunger (not shown) within an optional switch 206 extends into the notch. The switch 206 is attached by threaded engagement within an aperture 208 extending through a wall 210 of the back half 40 of the housing 36. Actuation of the switch 206 provides a signal indicating that the shift fork assembly 166 has moved the clutch collar 81 to place the transfer case 30 in its four-wheel drive operating state.

FRONT DRIVE AXLE ASSEMBLY

Figure 7:
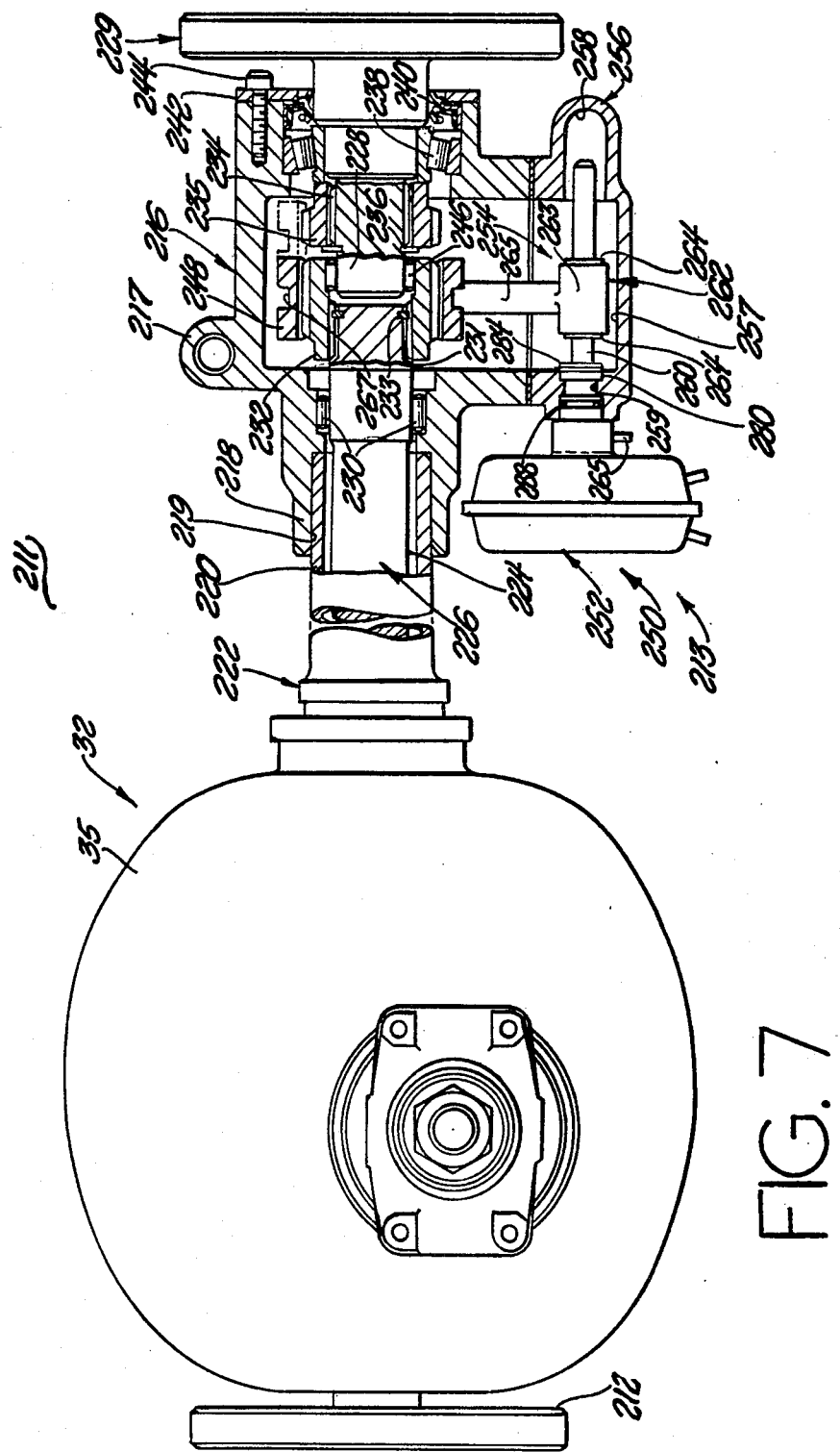
FIG. 7 is a side view, partially broken away, of a portion of the front drive mechanism for use in the present drive system including the axle disconnect system.

Referring now to FIG. 7, there is shown a portion of a front drive axle assembly 211 (pertinent to an understanding of the present invention) utilized in the vehicle drive system 20. The drive axle assembly 211 generally includes the front drive axle 32 and a control mechanism 213 to selectively control its operation in one or the other of the drive modes or states. The front drive axle 32 includes a first flange assembly 212 to which the wheel assembly 31 is attached. The flange assembly 212 is connected to the differential 35 of the front drive axle 32. The differential 35 is connected to the front drive shaft 39 and receives power from the transfer case 30 when the vehicle drive system 20 is in its four-wheel drive operating mode.

The drive axle 32 also includes an inner shaft assembly 222, a housing 216, and a second flange assembly 229. The housing 216 includes a collar 218 which has an internal opening 219 that receives an axle tube 220. The housing 216 includes a mounting boss 217 for securing the assembly 211 to the engine block.

The present invention can also be practiced with live axle systems wherein the axle is allowed to move with the wheels of the vehicle. Of course, in such systems, the housing would not be mounted to the engine block as the housing 216 is mounted.

An axle shaft or half-shaft 226 is attached to the differential 35 in a conventional fashion by splines and a retaining clip (not shown). The assembly 222 also includes an inner section 224 of the axle half-shaft 226. An outer section 228 of the axle half-shaft 226 is physically separated from the inner section 224 of the axle half-shaft 226 within the housing 216. Roller bearings 230 are disposed within the housing 216 and support the inner section 224 of the axle half-shaft 226.

The outer end of the inner section 224 of the axle half-shaft 226 has a helical spline 231 formed thereon. A gear 232, preferably of a 12-tooth configuration, is mounted on the spline 231 of the inner part 224 and secured thereto with an internal locking ring 233. The outer part 228 of the axle half-shaft 226 also includes a helical spline 234 at its inner end and which has a gear 235, also preferably having 12 teeth, mounted thereon and which is axially secured thereto by a retaining clip 236.

Figure 6:
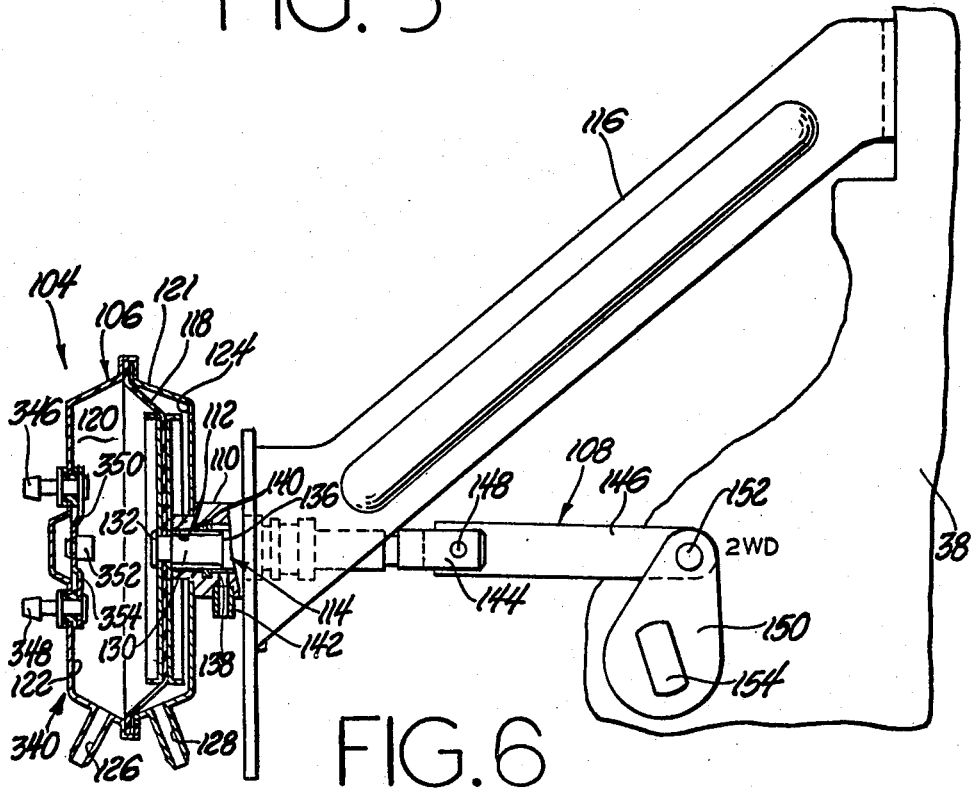
FIG. 6 is a sectional view, partially broken away, of a vacuum motor and related mechanisms used in conjunction with the transfer case of FIG. 2.

While not shown in FIG. 6, the flanged outer shaft assembly 229 has mounted thereto the right-hand wheel assembly 31 which includes the right front wheel 22. A medial portion of the outer shaft assembly 229 is supported within the housing 216 by tapered roller bearings 238 which are pressed to the outer part 228 of the axle half-shaft 226. The outer shaft assembly 229 is retained in the housing 216 in a conventional manner with a double lip seal 240 and a clamping plate 242 secured to the housing 216 by bolts 244 (only one of which is shown).

The inboard end of the outer section 228 of the axle half-shaft 226 is supported for rotation within surrounding needle bearings 246 which are piloted inside the gear 232.

The drive axle 32 has a two-wheel drive operating state wherein the inner and outer sections 224 and 228, respectively, of the axle half-shaft 226 are not coupled together, but rather are free to rotate independently of one another. The drive axle 32 also has a four-wheel drive operating state wherein the inner and outer parts 224 and 228, respectively, of the axle half-shaft 226 are coupled or locked together for corotation.

In FIG. 7 a clutch collar 248, preferably having 12 teeth, is shown in a position corresponding to the two-wheel drive operating state. In this position the clutch collar 248, the gear 232 and the inner part 224 of the axle half-shaft 226 rotate in a direction opposite the rotation of the shaft assembly 212 resulting in a relative speed differential of twice lefthand wheel speed between the inner and outer parts 224 and 228, respectively, of the axle half-shaft 226.

The control mechanism 213 includes a fluid actuated servomotor 250 having a vacuum motor 252 (substantially the same as the vacuum motor 106), and a shift fork assembly 254. The shift fork assembly 254, under control of a vacuum motor 252, controls the axial shifting of the clutch collar 248 between positions corresponding to the two-wheel-drive mode and the four-wheel-drive mode. In the two-wheel drive mode, the clutch collar 248 is, as shown in FIG. 7, in engagement with only the gear 232. In this position, the half-shaft sections 224 and 228 are decoupled and the differential 35 is disconnected from the wheel associated with the flange assembly 229. In the four-wheel drive mode, the clutch collar 248 is shifted axially (rightward in FIG. 7) as indicated in phantom), to engage the gears 232 and 235 to cause the half-shaft sections to rotate in common. In this position, the differential 35 transmits power through the connected half-shaft sections 224 and 228 to the wheel associated with the flange assembly 229.

A cover 256 houses a vacuum motor shaft 260 and accommodates axial displacement of the shaft in response to actuation of the vacuum motor 252. The housing 256 receives the shaft 260 through a bore 259 at one end and accommodates its full axial extension within a hollow projection 258 at the other end. The cover 256 is secured to the housing 216 by conventional fasteners.

The shift fork assembly 254 includes a clutch fork 262 having a collar 263, retained on the vacuum motor shaft 260 by means of conventional retainer clips 264, and an integral arm 265 which projects perpendicularly from the bushing and engages the clutch collar 248 within an annular groove 267 formed therein.

The free end 266 of the vacuum motor shaft 260 is supported for sliding movement within a bushing 268 which, in turn, is fixedly mounted in the projection 258 in the cover 256.

A second bushing 280 is disposed within the bore 259 and supports sliding movement of the vacuum motor shaft 260. The second bushing 280 is secured within the bore 259 by a clip 284. Another bushing 286 connected to the vacuum motor 252 is sealed within the bore 259 by an oil seal 288.

When the appropriate vacuum signal is applied to the vacuum motor 252, the vacuum motor shaft 260 shifts to its extended position, and the clutch collar 248 shifts to a position corresponding to the four-wheel drive operating state in preparation for placing the entire vehicle drive system 20 in its four-wheel drive mode.

As previously described with reference to the servomotor 104, the vacuum motor shaft 260 uncovers an integral vacuum port (not shown) formed in the bushing 286 which transmits a vacuum signal through a nipple 265 to the outboard vacuum port 126 of the transfer case vacuum motor 106, thereby initiating a change in the operating state of the transfer case 30 from two-wheel drive to four-wheel drive.

CONTROL SYSTEM

Figure 10:
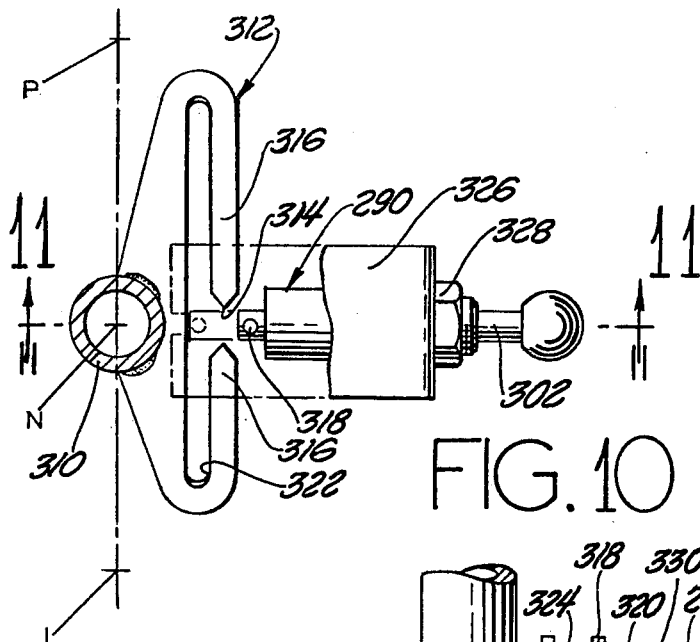
FIG. 10 is a plan view, partially broken away, of an operator control mechanism located in the driver's compartment of the vehicle for changing the operating mode of the drive system.
Figure 11:
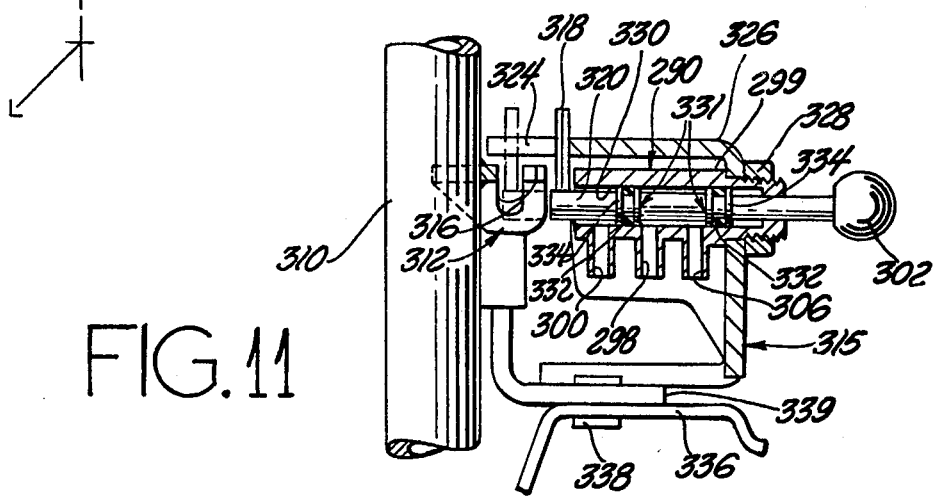
FIG. 11 is a sectional view, partially broken away, taken along lines 11—11 of FIG. 10 showing the control mechanism in one of its control positions in phantom.
Figure 8:
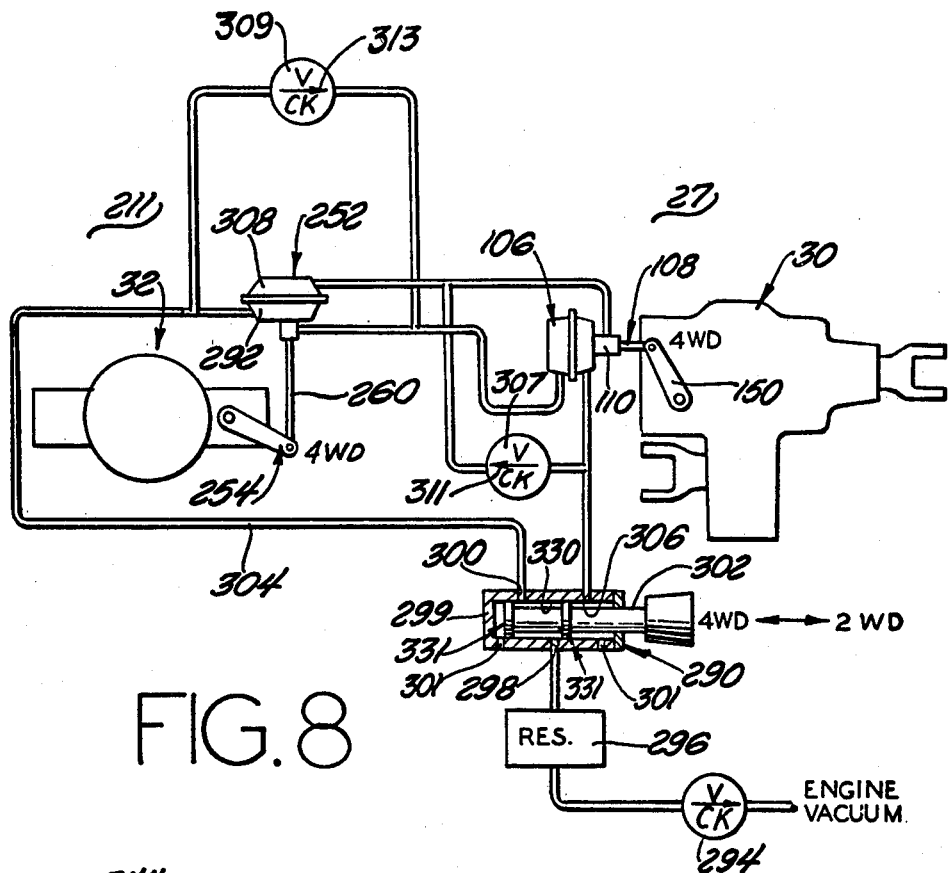
FIG. 8 is a schematic view showing a control system for use in the present drive system.

Referring now to FIG. 8, FIG. 10 and FIG. 11, a fluid or vacuum control system of the vehicle drive system 20 is described. However, it is to be understood that other types of control systems, such as electrical, could be utilized without departing from the teachings of the invention.

The vacuum control system includes a vacuum switch which in a first embodiment is schematically illustrated at 290 in FIG. 8 as a spool valve having a two-wheel drive operating position and a four-wheel drive operating position to selectively place the vehicle drive system 20 in a two-wheel drive operating mode or a four-wheel drive operating mode.

In its four-wheel drive operating position as shown in FIG. 8, the vacuum switch 290 allows the vacuum source such as the vacuum from the engine intake manifold, to be applied to the inner chamber 292 of the vacuum motor 252 through a circuit. The fluid path to chamber 299 is through a check valve 294, a vacuum reservoir 296 and a control cylinder 299. The path includes a passage through a common inlet port 298 of the control cylinder 299 and a first outlet port 300 of the control cylinder 299. The vacuum is transmitted by a line 304 to the inner chamber 292 of the vacuum motor 252.

As previously mentioned, after the vacuum switch 290 has been moved to its four-wheel drive operating position, the fluid control signal applied to the inner chamber 292 of the vacuum motor 252 causes the clutch fork 262 and the clutch collar 248 to move to shift laterally and couple the inner and outer sections 224 and 228 of the axle half-shaft 226. If gear butting occurs between the clutch collar 248 and the gear 235, the integral communication port in the bushing 286 remains blocked by the shaft 260 and prevents the vacuum control signal from being communicated through the nib 265. When the butting condition is removed and the shift of the drive axle 32 into its four-wheel drive operating state is completed, the vacuum control signal is communicated through the nib 265 to the outer chamber 122 of the volume 120 in the vacuum motor 106 to cause the fork 174 and clutch collar 81 to shift laterally and engage the carrier 80 supporting the drive sprocket 82.

The shifting sequence just described assures that the drive axle 32 is first shifted into its four-wheel drive operating state before the transfer case 30 is shifted out of its two-wheel drive operating state. Otherwise, with an inter-axle differential, if the drive axle 32 is in its two-wheel drive operating state and the transfer case 30 is in its four-wheel drive operating state, differential action would allow the vehicle to move when the transmission 28 is in the "park" position (if an automatic transmission) or in "gear" (if a standard transmission).

When the control shaft 302 of the vacuum switch 290 is moved to the right as shown in FIG. 8, the vacuum switch 290 is placed in its two-wheel drive operating position and the sequence of control signals occurring at the vacuum motor 252 and the vacuum motor 106 is reversed. Initially, a vacuum control signal is applied to the inner chamber 124 of the volume 120 within the vacuum motor 106 through a second outlet port 306 in the control cylinder 299. The transfer case 30 shifts into its two-wheel drive operating state and the output port 138 is uncovered by the movement of the vacuum motor shaft 114 to allow a vacuum control signal to be transmitted to the outer chamber 308 of the vacuum motor 252 to disconnect the inner and outer sections 224 and 228, respectively, of the axle half-shaft 226.

Check valves 307 and 309 are provided to facilitate the shifting action of the vacuum motors 106 and 252, respectively. Arrows 311 and 313 indicate the direction of air flow within the check valves 106 and 252, respectively.

The shifting sequence between four-wheel drive and two-wheel drive is controlled in the above manner to avoid the condition where the transfer case 30 is in four-wheel drive and the front drive axle 32 is in two-wheel drive for the reason previously explained.

Referring now to FIGS. 10 and 11, there is shown in greater detail an embodiment of the vacuum switch 290 in cooperative relation with a floor-mounted transmission shift lever 310. In FIG. 10, the shift lever 310 is in its neutral position. The vacuum switch 290 is mounted to one side of the lever 310 by a bracket assembly 311.

Actuation of the vacuum switch 290 is mechanically inhibited in all shift lever positions except neutral by a gate structure 312 which is connected to the lever 310. The gate structure 312 includes an opening 314 defined by a pair of pointed opposing fingers 316. The opening 314 allows an upwardly extending pin 318 connected at the free end 320 of the control shaft 302 to pass therethrough and into an elongated slot 322 formed in the gate structure 312. The slot 322 extends parallel to the shifting path of the lever 310. The pin 318 extends through a slot 324 formed through a top wall portion 326 of the bracket assembly 311 to permit the shifting of the control shaft 302 between its two-wheel drive operating position and its four-wheel drive operating position (shown in phantom in FIGS. 10 and 11). The control cylinder 299 is secured within a side wall portion 327 of the bracket assembly 311 by a threaded nut 328.

The control shaft 302 slides in sealed relation within a pair of spaced spools 331 disposed within an axial bore 330 formed in the control cylinder 299. Each of the spools 331 has a pair of collars 334 at its opposed ends. The collars 334 have seals 332 fitted thereabout to seal them in the bore 330.

The opposing fingers 316 of the gate structure 312 are pointed so that if the control shaft 302 is positioned midway between its four-wheel drive operating position and its two-wheel drive operating position, the finger portions 316 will engage the pin 318 to move the control shaft 302 either towards the four-wheel drive operating position or its two-wheel drive operating position as the lever 310 is moved out of its neutral position.

The bracket assembly 311 is mounted adjacent the lever 310 on a floor panel 336 of the vehicle by a rivet 338 which extends therethrough to secure a bottom wall portion 339 of the mounting structure 311 to the floor panel 336.

Referring now to FIGS. 12, 13, 14, 15 and 16, there is shown in detail a second and preferred embodiment of a vacuum switch assembly 350 mounted on the vehicle's instrument panel 352 by means of an integral mounting bracket 354. The switch assembly 350 includes a shift lever assembly 356 which extends through an elongated slot 358 formed through a front wall portion 360 of the mounting bracket 354. The mounting bracket 354 is mounted to the instrument panel 352 at its front wall portion 360 by means of screws 361.

The lever assembly 356 includes a head portion 362 mounted at one end of a lever 364 and which is adapted to be manually engaged by the operator of the vehicle. The opposite end of the lever 364 is fixedly mounted to a retainer 366 of the lever assembly 356. Both the lever 364 and the retainer 366, in turn, are mounted to move with a rotatable adjustment shaft 368 of a conventional vacuum switch 370 by a set screw 372. The vacuum switch 370 is mounted on an inwardly extending, integral flange portion 374 of the mounting bracket 354 by means of a washer 376 and a threaded nut 378 which are attached to a threaded collar portion 380 of the vacuum switch 370 to secure the vacuum switch 370 to the flange portion 374.

The vacuum switch 370 includes inwardly extending nibs 382 for establishing the proper interconnections of the vacuum switch 370 with the vacuum hoses or lines of the control system previously described. The middle nib is in communication with the vacuum reservoir 296 and the outer nibs are in communication with their respective vacuum motors 252 and 106.

Figure 12:
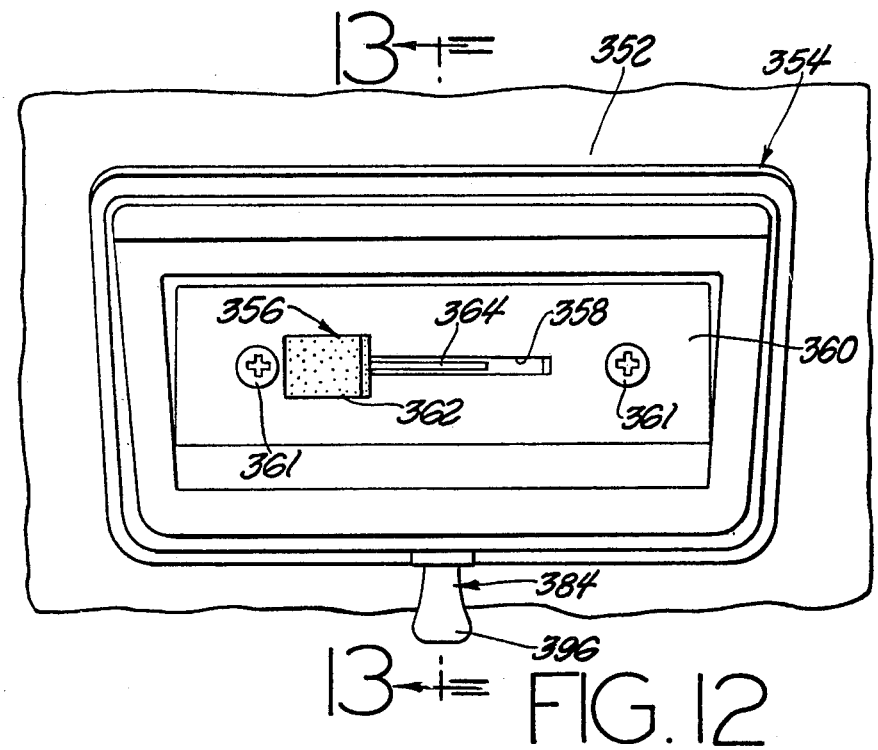
FIG. 12 is a side view, partially broken away, of an instrument panel showing a second embodiment of an operator control mechanism for changing the operating mode of the drive system.
Figure 13:
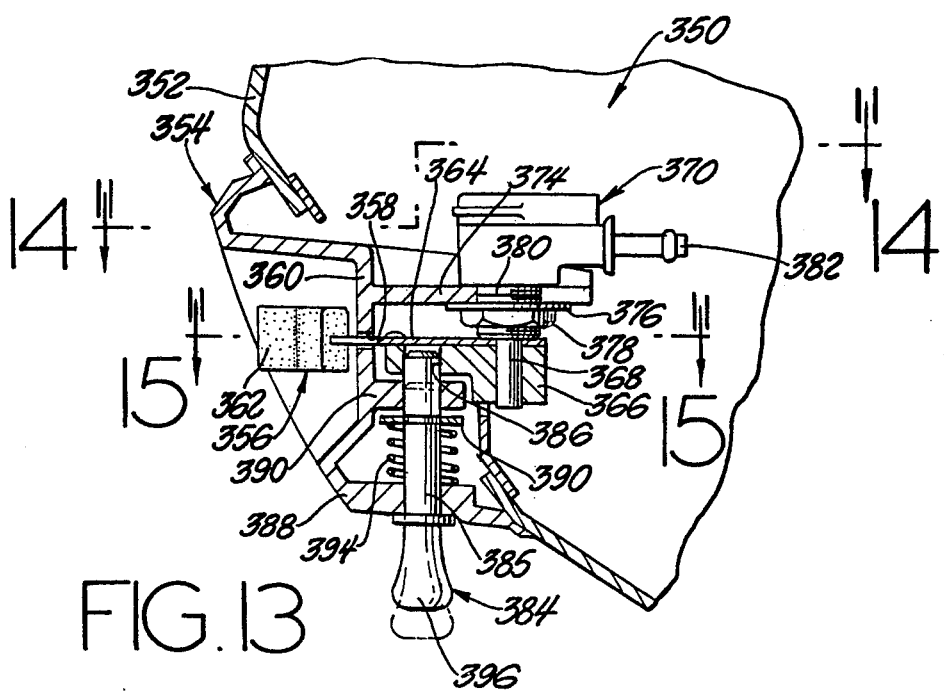
FIG. 13 is a sectional view, partially broken away, taken along lines 13—13 of FIG. 12 showing a locked position of the mechanism and an unlocked position in phantom.
Figure 14:
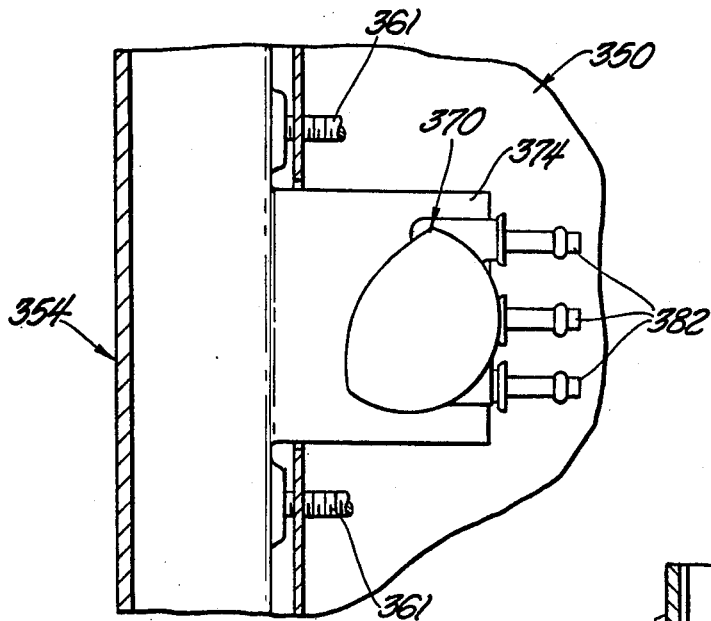
FIG. 14 is a sectional view, partially broken away, taken along lines 14—14 of FIG. 13.
Figure 16:
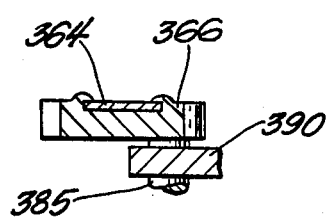
FIG. 16 is a sectional view, partially broken away, taken along lines 16—16 of FIG. 15.
Figure 15:
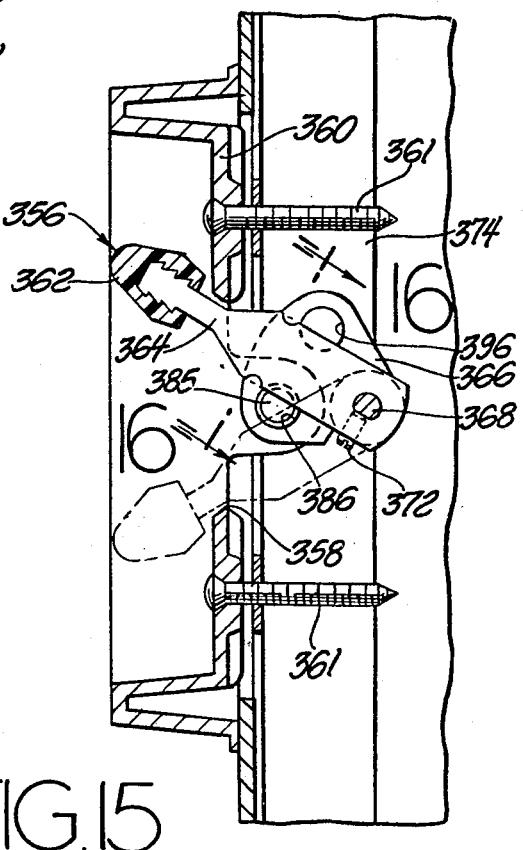
FIG. 15 is a sectional view, partially broken away, taken along lines 15—15 of FIG. 13.

As shown in FIG. 12 the lever assembly 356 and, consequently, the vacuum switch 370 is in its two-wheel drive operating position and is locked therein by a locking assembly 384 including a shaft 385 which extends upwardly into a first locking hole 386 formed in the retainer 366 and which corresponds to the two-wheel drive operating position. The shaft 385 extends through a bottom wall portion 388 and a second inwardly extending flange portion 390 of the mounting bracket 354. The locking assembly is biased or locked by a spring 394 which is positioned about the shaft 385 between the bottom wall portion 388 and a retaining ring 390 fixedly mounted on the shaft 385 below the flange portion 390. The locking assembly 384 is provided with a knob 396 to facilitate shifting of the shaft 385 to disengage the shaft 385 from the retainer 366 (as shown in phantom in FIG. 13). After disengagement, the operator moves the lever assembly 356 to the right as shown in FIG. 12 (and as shown in phantom in FIG. 15) to thereby place the switch assembly 350 in its four-wheel drive operating position through rotation of the pivot shaft 368 of the vacuum valve 370. The operator then releases the knob 396 so that the spring 394 urges the shaft 385 into a second locking hole 396 to thereby lock the lever assembly 356 and thereby the vacuum switch 370 in its four-wheel drive operating position.

In summation, the switch assembly 350 is movable between first and second rotational positions for changing operating modes between two-wheel drive and four-wheel drive. The switch assembly 350 is specifically designed for two-handed operation in order to change operating modes and lock the switch assembly 350 in the desired operating mode.

SHIFT INDICATOR SYSTEM

Figure 9:
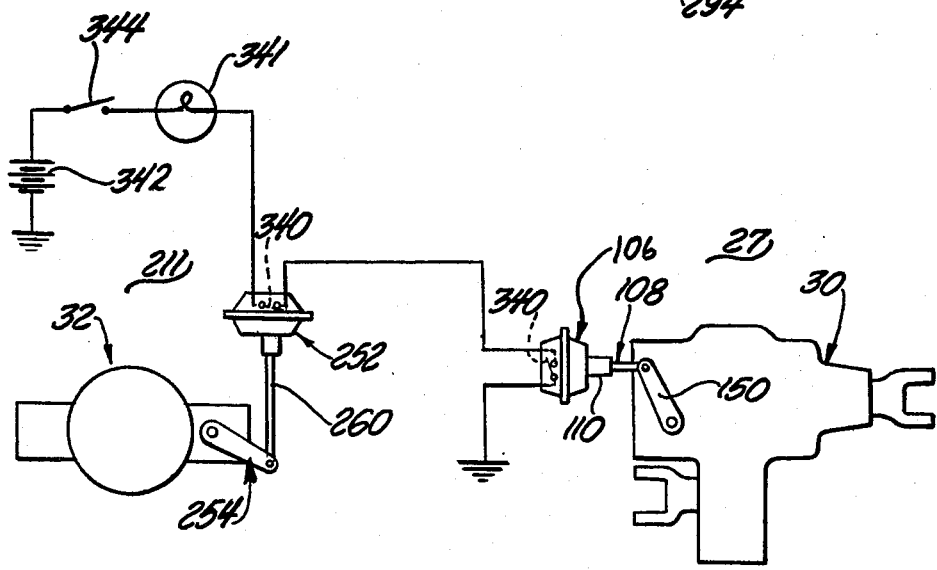
FIG. 9 is a schematic view showing an electrical indicator system for use in the present drive system.

Referring now to FIG. 9, there is shown an electrical indicator system associated with the vacuum motors 256 and 106 which may be provided for indicating to the operator of the vehicle whether or not a particular shift between the two-wheel drive operating mode and the four-wheel drive operating mode has been completed. If the shift is incomplete, the indicator light 341 will be energized. The vacuum motor 106 and the vacuum motor 252 are both provided with internal switches 340, only one of which is shown in detail with reference to the vacuum motor 106 of FIG. 6. The switches 340 are connected in series with an indicator lamp 341, the vehicle battery 342 and the vehicle ignition switch 344. The indicator lamp 341 is energized when the vehicle is running (as indicated by closed ignition switch 344) and both of the switches 340 are closed to indicate that the drive axle 32 is in its four-wheel drive operating state and the transfer case 30 is in its two-wheel drive operating state (i.e. when the shift between the four-wheel drive operating mode and the two-wheel drive operating mode is only half-completed).

Referring now to FIG. 6, there is shown a preferred embodiment of the switches 340. Each of the switches 340 includes a pair of terminals 346 and 348. The terminal 346 is electrically connected to a flexible metal plate 350 having an end cap 352 in aligned relation with the vacuum motor shaft 114. The plate 350 electrically contacts a second metal plate 354 to establish electrical contact with the end cap 352. The end cap 352 is electrically connected to the other terminal 348. The terminals 346 and 348 are electrically connected to each other thereby closing the switch 340. In the four-wheel drive operating state of the transfer case 30, wherein the diaphragm 118 has moved to the left as shown in FIG. 6, the fastener 132 pushes the end cap member 352 to the left to electrically disconnect the first plate 350 from the second plate 354 thereby opening the switch 340 and prevent the indicator lamp 341 from being energized by the battery 322.

SYSTEM OPERATION

Assuming first that the vehicle drive system is in its four-wheel drive operating mode and is to be changed to its two-wheel drive mode. The operator of the vehicle first moves the shift lever 310 to its neutral position as shown in FIG. 10 to allow the control shaft 302 of the vacuum switch 290 to be moved to its two-wheel drive operating position as shown by the solid lines in FIGS. 10 and 11. The vacuum control signal travels from the outlet port 306 to the inner chamber of the vacuum motor 106 causing the lever 150 to move to the right as shown in FIG. 8 to thereby move the shift fork assembly 166 to the left as shown in FIG. 5. The assembly 166 shifts the clutch collar 81 to the left to couple the main shaft 64 to the rear output shaft 76 and, at the same time, disconnects the clutch collar 81 from the carrier 80 to disengage the power take-off chain 84. When the linkage 108 including the vacuum motor shaft 114 has moved sufficiently to uncover the port 138 (i.e. preferably 85% of its maximum linear movement) the vacuum control signal is provided through the nib 142 to the outboard side 308 of the vacuum motor 252 to cause its flexural diaphragm (not shown) therein to move toward its internal switch 340 to cause the vacuum motor shaft 260 to move the shifting fork assembly 254 to the left as shown in FIG. 6 thereby uncoupling the inner and outer parts 224 and 228, respectively, of the axle half-shaft 226.

In the two-wheel drive operating state of the drive axle 32 the differential gears within the differential 35 are allowed to rotate with no effective load. Such rotation results in minor or negligible power consumption since the ring and pinion gears therein are idled.

If during the change in operating mode described immediately above the drive axle 32 is unable to change from its four-wheel operating state to its two-wheel drive operating state, the indicator lamp 341 will be energized to indicate to the operator of the vehicle that the vehicle drive system 20 is not completely in in its two-wheel drive operating mode.

To change from the two-wheel drive operating mode to the four-wheel drive operating mode, the operator moves the shift lever 310 to its neutral position as shown in FIG. 10 and slides the control shaft 302 to move the pin 318 through the opening 314 and into the slot 322 as indicated by the phantom lines in FIGURES 10 and 11. The slot 322 allows the operator to change gear selections by moving the lever 310 between its various positions. In the four-wheel drive position of the switch 290, a vacuum control signal is transmitted through the switch 290 and the outlet port 300 to create an effective vacuum within the inner chamber 292 of the vacuum motor 252 to cause flexing of the diaphragm therein. Flexure of the diaphragm causes the vacuum motor shaft 260 to further extend from the vacuum motor 252 to cause the shift fork assembly 254 to couple the inner and outer sections 224 and 228, respectively, of the axle half-shaft 226 by means of the clutch collar 248. When the shaft 260 has moved, preferably, approximately 85% of its total shift, a feedback control signal travels from the collar member 286 to the outer chamber 122 of the volume 120 within the vacuum motor 106 to thereby move the vacuum motor shaft 114 and the lever 150 to the left as shown in FIG. 6. As a result, the shift fork assembly 166 is moved to the right and couples the drive sprocket 82 to the side gear 66 of the differential 68 so that the main shaft 54 can differentially drive the front drive mechanism 29 and its corresponding front wheels 22 and rear wheels 24 through the rear drive shaft 41.

Again, if the shifting sequence has not been completed (i.e. the drive axle 32 is in its four-wheel drive operating state and the transfer case 30 is in its two-wheel drive operating state), the indicator lamp 341 will be energized to indicate that condition.

While a preferred embodiment of the invention has been shown and described herein in detail, those skilled in this art will recognize various alternative designs and embodiments for practicing the present invention as defined by the following claims.

What is claimed is:

1. An axle for a four-wheel drive vehicle of the type which has a four-wheel drive mode and a two-wheel drive mode wherein in the two-wheel drive mode the wheels associated with the axle rotate independent of the vehicle drive train and in the four-wheel drive mode the wheels are coupled to the drive train in driven relation therewith, the axle comprising:
   a differential;
   a first axle shaft interconnected between the differential and one of the wheels;
   a second axle shaft adapted for interconnection between the differential and the other of the wheels, at least one of said axle shafts having an inner section and an outer section;
   coupling means associated with said one of said axle shafts for selectively coupling the outer and inner sections thereof;
   control means, associated with said coupling means and responsive to a control signal of a first character for actuating the coupling means to couple the inner and outer axle shaft sections for operation of the axle in four-wheel drive mode, and responsive to a control signal of a second character for actuating the coupling means to decouple the inner and outer axle shaft sections for operation in the two-wheel drive mode; and
   signaling means responsive to the position of the coupling means, to provide a position indicating signal for feedback in controlling the condition of a transfer case in moving between the two-wheel drive mode and the four-wheel drive mode.

2. The axle as defined in claim 1 wherein said control means includes a fluid motor wherein said first and second control signals comprise fluid pressure control signals, said fluid motor being responsive to the fluid pressure control signals.

3. The axle as defined in claim 2 wherein said fluid motor comprises a vacuum motor.

4. The axle as defined in claim 1 wherein said control means includes a fluid motor wherein said first and second control signals comprise fluid pressure control signals wherein said fluid motor is responsive to the fluid control signals, said signaling means being operatively associated with said fluid motor to provide a fluid pressure control signal to indicate the position of the coupling means.

5. The axle as defined in claim 4 wherein said signaling means includes a cylinder having a radial port extending therethrough and wherein said fluid motor includes a movable piston slidably received in said cylinder; said cylinder opening the port in the first operating state to allow fluid pressure to flow through the port to provide the fluid pressure control signal to indicate the position of the coupling means.

6. The axle as defined in claim 1 wherein said coupling means includes a movable clutch collar.

7. An axle for a four-wheel drive vehicle of the type which has a four-wheel drive mode and a two-wheel drive mode wherein in the two-wheel drive mode the wheels associated with the axle rotate independent of the vehicle drive train and in the four-wheel drive mode the wheels are coupled to the drive train in driven relation therewith, the axle comprising:
   a differential;
   a first axle shaft interconnected between the differential and one of the wheels;
   a second axle shaft adapted for interconnection between the differential and the other of the wheels, at least one of said axle shafts having an inner section and an outer section;
   coupling means associated with said one of said axle shafts for selectively coupling the outer and inner sections thereof; and
   a control means including a vacuum motor associated with said coupling means and responsive to a fluid pressure control signal of a first character for actuating the coupling means to couple the inner and outer axle shaft sections for operation of the axle in the four-wheel drive mode and responsive to a fluid pressure control signal of a second character for actuating the coupling means to decouple the inner and outer axle shaft sections for operation in the two-wheel drive mode wherein the control means controls the condition of a transfer case in moving between the two-wheel drive mode.

8. The axle as claimed in claim 7 wherein said vacuum motor includes a centrally mounted diaphragm and an input port for each of said control signals, said ports being in fluid communication with opposite sides of said diaphragm.

* * * * *